(12) United States Patent
Yamaguchi et al.

(10) Patent No.: US 12,534,030 B2
(45) Date of Patent: Jan. 27, 2026

(54) INTERIOR COMPONENT

(71) Applicant: TOYOTA BOSHOKU KABUSHIKI KAISHA, Aichi (JP)

(72) Inventors: Tsuyoshi Yamaguchi, Aichi-ken (JP); Yohei Ishizu, Aichi-ken (JP); Mitsutaka Sako, Aichi-ken (JP)

(73) Assignee: TOYOTA BOSHOKU KABUSHIKI KAISHA, Aichi (JP)

( * ) Notice: Subject to any disclaimer, the term of this patent is extended or adjusted under 35 U.S.C. 154(b) by 379 days.

(21) Appl. No.: 18/122,288

(22) Filed: Mar. 16, 2023

(65) Prior Publication Data

US 2023/0311786 A1    Oct. 5, 2023

(30) Foreign Application Priority Data

Apr. 1, 2022 (JP) ................................. 2022-061784

(51) Int. Cl.
| | | |
|---|---|---|
| *B60R 13/02* | (2006.01) | |
| *D03D 1/00* | (2006.01) | |
| *D03D 15/547* | (2021.01) | |
| *F21V 8/00* | (2006.01) | |

(52) U.S. Cl.
CPC ...... *B60R 13/0243* (2013.01); *B60R 13/0206* (2013.01); *D03D 1/00* (2013.01); *D03D 15/547* (2021.01); *D10B 2505/12* (2013.01); *G02B 6/001* (2013.01)

(58) Field of Classification Search
USPC .............................................. 296/1.08, 146.7
See application file for complete search history.

(56) References Cited

U.S. PATENT DOCUMENTS

| | | | | |
|---|---|---|---|---|
| 5,941,590 A | * | 8/1999 | Reynolds ................ | B29C 70/78 |
| | | | | 296/39.1 |
| 6,177,155 B1 | * | 1/2001 | Kurosaki ................ | B60R 13/02 |
| | | | | 52/716.5 |
| 6,851,844 B2 | * | 2/2005 | Guy ........................ | G02B 6/001 |
| | | | | 362/570 |
| 7,156,437 B2 | * | 1/2007 | Cowelchuk ............. | B60R 13/02 |
| | | | | 296/187.05 |

(Continued)

FOREIGN PATENT DOCUMENTS

| | | |
|---|---|---|
| JP | H03246133 | 11/1991 |
| JP | H03246133 A * | 11/1991 |

(Continued)

OTHER PUBLICATIONS

Translation of WO 2011113617 (Year: 2011).*

(Continued)

*Primary Examiner* — Amy R Weisberg
*Assistant Examiner* — Veronica M Condo
(74) *Attorney, Agent, or Firm* — Greenblum & Bernstein, P.L.C.

(57) ABSTRACT

The present interior component includes a plate-shaped base material to be fastened to the base member and a skin material for covering the front surface of the base material. The skin material has a woven fabric in which an optical fiber is woven as a constituent yarn, the skin material is provided with a folded portion turned back to the back surface of the base material while being folded into a plurality of sheets, and a clip body for clipping the folded portion is provided on the back surface of the base material.

7 Claims, 9 Drawing Sheets

(56) References Cited

U.S. PATENT DOCUMENTS

| | | | |
|---|---|---|---|
| 8,449,161 B2 * | 5/2013 | Igoe | B60Q 3/745 |
| | | | 362/558 |
| 10,703,264 B2 * | 7/2020 | Yamada | B60Q 3/745 |
| 10,906,462 B2 * | 2/2021 | Schmitz | B60R 13/0243 |
| 2015/0130204 A1 * | 5/2015 | Takezawa | B60R 13/0206 |
| | | | 296/1.08 |
| 2017/0267189 A1 | 9/2017 | Hirose et al. | |
| 2017/0297484 A1 | 10/2017 | Yamada et al. | |
| 2019/0030858 A1 | 1/2019 | Kameda et al. | |
| 2023/0133552 A1 * | 5/2023 | Ieiri | B60R 13/0243 |
| | | | 296/39.1 |
| 2023/0303012 A1 * | 9/2023 | Mallent Bertolin | |
| | | | B60R 13/0206 |

FOREIGN PATENT DOCUMENTS

| | | | |
|---|---|---|---|
| JP | 7-304399 | 11/1995 | |
| JP | 2005-225391 | 8/2005 | |
| JP | 2012-240573 | 12/2012 | |
| JP | 2013-091425 | 5/2013 | |
| JP | 2013091425 A * | 5/2013 | |
| JP | 2017-193200 | 10/2017 | |
| WO | WO-2011113617 A1 * | 9/2011 | B60R 13/02 |

OTHER PUBLICATIONS

Office Action issued in Japan Patent Appl. No. 2022-061784, dated Jul. 8, 2025, along with an English translation thereof.

Office Action issued in CHINA Patent Appl. No. 202310259218.8, dated Dec. 4, 2025, along with an English translation thereof.

* cited by examiner

FIG. 1
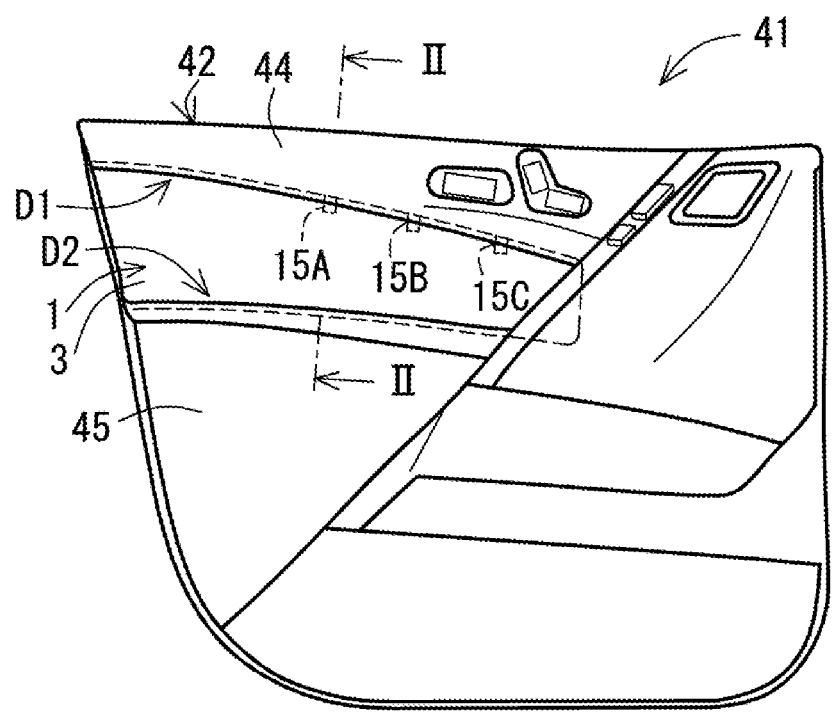
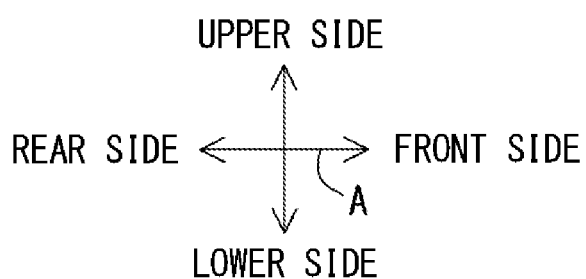

REAR SIDE ⟷ FRONT SIDE
  A

FRONT SIDE ⟵⟶ REAR SIDE
  A

INTERIOR COMPONENT

INCORPORATION BY REFERENCE

This application claims priority to Japanese Patent Application No. 2022-061784 filed on Apr. 1, 2022 based on U.S. Patent Law § 119, the disclosure of which is expressly incorporated herein by reference in its entirety.

BACKGROUND OF THE INVENTION

Technical Field

The present invention relates to an interior component and more particularly to an interior component comprising a plate-shaped base material to be fastened to a base member and a skin material for covering the front surface of the base material.

Background Art

As a conventional interior component, for example, as shown in FIG. 12, an ornament 101 constituting a vehicular door trim 141 is generally known. The ornament 101 comprises a plate-shaped base material 102 to be fastened to a base member 143 and a skin material 103 for covering the front surface of the base material 102. As the skin material 103, an optical fiber skin material including a woven fabric in which optical fibers are woven as constituent yarns may be used. In most cases, the optical fiber skin material 103 has a planar rectangular shape so that the optical fibers are not cut. When the optical fiber skin material 103 having a planar rectangular shape is attached so as to cover the front surface of the base material 102 having a shape other than a planar rectangular shape, for example, as illustrated in FIG. 13, excess portions 103a, 103b (indicated by hatching in the drawing) of the optical fiber skin material 103 need to be turned back to a back surface of the base material 102 and attached thereto. In a case where the excess portions 103a, 103b of the optical fiber skin material 103 are not fixed on the back surface of the base material 102, the optical fibers may be damaged during wiring or the like.

Here, a fastening portion 131 to be fastened to the base member 143 is provided on the back surface of the base material 102. The fastening portion 131 is required to be set in the vicinity of a parting D1 (that is, a joint portion between the ornament 101 and an upper board 144; a portion of the ornament 101 to which a pressing force from the upper board 144 is applied) in a design of the ornament 101. However, in the ornament 101, the excess portion 103a of the optical fiber skin material 103 is turned back to the back surface of the base material 102 and attached thereto, and thus, the fastening portion 131 cannot be set in a region corresponding to the attachment margin. That is, the fastening portion 131 cannot be disposed on a side closer to an outer edge of the base material 102, and must be set away from the parting D1 in a design of the ornament 101. This problem occurs not only in the ornament 101 constituting the vehicular door trim 141, but also in any interior component having a form in which an excess portion of an optical fiber skin material is turned back to a back surface of a base material similarly.

Note that JP H03-246133 A describes a technique in which an excess portion of a skin material is turned back to a back surface side of a base material, and a locking plate provided in the excess portion is locked by a locking means provided on the back surface of the base material, but does not describe, at all, a technique for reducing a region, of an excess portion in a skin material, turned back to the back surface of the base material.

SUMMARY OF INVENTION

An embodiment of the present invention has been made in view of the abovementioned current condition, and intends to provide an interior component in which, by reducing a region, of an excess portion in a skin material, turned back to a back surface of a base material, a fastening portion for a base member is disposed on a side closer to the outer edge of the back surface of the base material to bring the fastening portion closer to a parting in a design of the interior component.

In summary, the present embodiment is an interior component comprising a plate-shaped base material to be fastened to a base member, and a skin material for covering a front surface of the base material, wherein the skin material has a woven fabric in which an optical fiber is woven as a constituent yarn, the skin material is provided with a folded portion turned back to a back surface of the base material while being folded into a plurality of sheets, and a clip body for clipping the folded portion is provided on the back surface of the base material.

In summary, in another embodiment, a fastening portion to be fastened to the base member may be provided on the clip body.

In summary, in still another embodiment, the clip body may include a first wall portion rising on the back surface of the base material, a second wall portion extending from a rising end side of the first wall portion toward an outer edge of the base material, and a third wall portion extending from an end side on a side close to the outer edge of the base material in the second wall portion toward the back surface of the base material, a gap may be formed between the third wall portion and a tip of a protrusion protruding from the back surface of the base material, and the folded portion may be inserted into the clip body through the gap to be clipped between the second wall portion and the back surface of the base material.

In summary, in still another embodiment, a plurality of the clip bodies may be provided along at least one side portion of the base material.

In summary, in still another embodiment, the interior component may be an ornament constituting a vehicular door trim.

In the interior component according to the present embodiment, the skin material has a woven fabric in which an optical fiber is woven as a constituent yarn, the skin material is provided with a folded portion turned back to a back surface of the base material while being folded into a plurality of sheets, and a clip body for clipping the folded portion is provided on the back surface of the base material. Accordingly, a region, of an excess portion in the skin material, turned back to the back surface of the base material can be reduced. Therefore, the fastening portion for the base member can be disposed on the side closer to the outer edge of the back surface of the base material to bring the fastening portion closer to a parting in a design of the interior component.

When the fastening portion to be fastened to the base member is provided on the clip body, it is possible to bring the fastening portion further closer to the parting in the design of the interior component.

Besides, in a case where the clip body includes a first wall portion, a second wall portion, and a third wall portion, a gap is formed between the third wall portion and a tip of a protrusion protruding from the back surface of the base material, and the folded portion is inserted into the clip body through the gap to be clipped between the second wall portion and the back surface of the base material, it is possible to clip the folded portion easily and firmly.

Furthermore, in a case where a plurality of the clip bodies are provided along at least one side portion of the base material, the elongated folded portion can be clipped without swinging.

BRIEF DESCRIPTION OF DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

FIG. 1 is a front view of a vehicular door trim provided with an ornament according to an example.

FIG. 8A illustrates a cross-section taken along line a-a in FIG. 5; FIG. 8B illustrates a cross-section taken along line b-b; and FIG. 8C illustrates a cross-section taken along line c-c.

FIG. 11A shows a form in which a protrusion is disposed inward with respect to an outer edge side of the base material; FIG. 11B shows a form in which a tip of a third wall portion faces a portion inward with respect to the protrusion on the back surface of the base material; and FIG. 11C shows a form in which a gap is formed between a tip of a second wall portion and the protrusion.

FIG. 13A shows a state before an excess portion of a skin material is turned back to a back surface of a base material; and FIG. 13B shows a state in which the excess portion of the skin material is turned back to the back surface of the base material.

DESCRIPTION OF EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description is taken with the drawings making apparent to those skilled in the art how the forms of the present invention may be embodied in practice.

Figure 2:
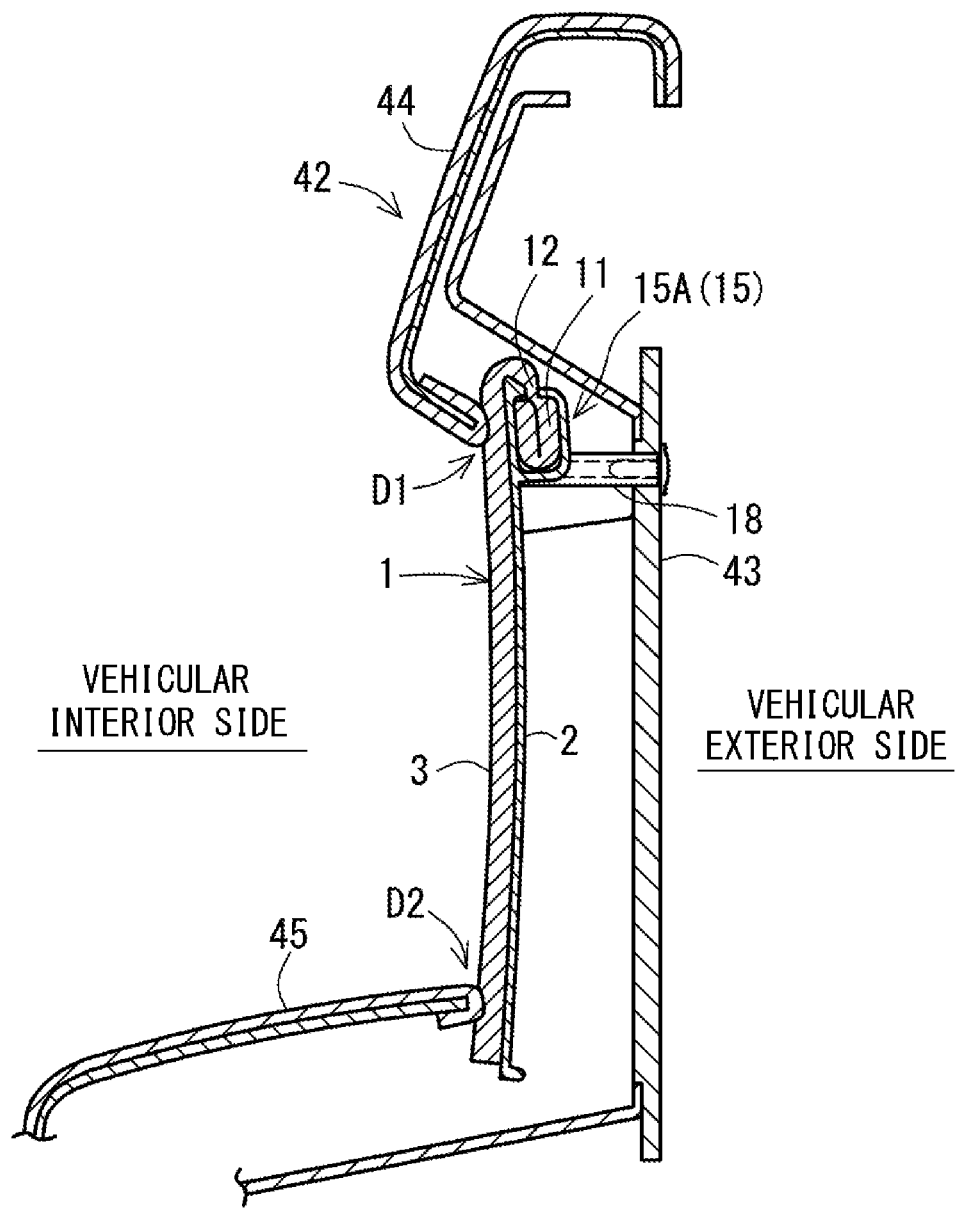
FIG. 2 is a cross-sectional view taken along line II-II of FIG. 1.

An interior component 1 according to the present embodiment includes a plate-shaped base material 2 to be fastened to a base member 43, and a skin material 3 for covering a front surface of the base material 2, as illustrated in FIGS. 1 and 2, for example. The skin material 3 has a woven fabric 7 in which optical fibers 4 are woven as constituent yarns. The skin material 3 is provided with a folded portion 11 turned back to a back surface of a base material while being folded into a plurality of sheets. A clip body 15 for clipping the folded portion 11 is provided on the back surface of the base material 2.

The shape of the base material 2 is not particularly limited. The base material 2 can have a planar shape other than a planar rectangular shape (including a square shape). Specifically, the base material 2 can be formed in an elongated shape, and can have a planar shape in which a plate width thereof in a direction orthogonal to the elongated direction gradually changes along the elongated direction (see FIG. 5).

Figure 6:
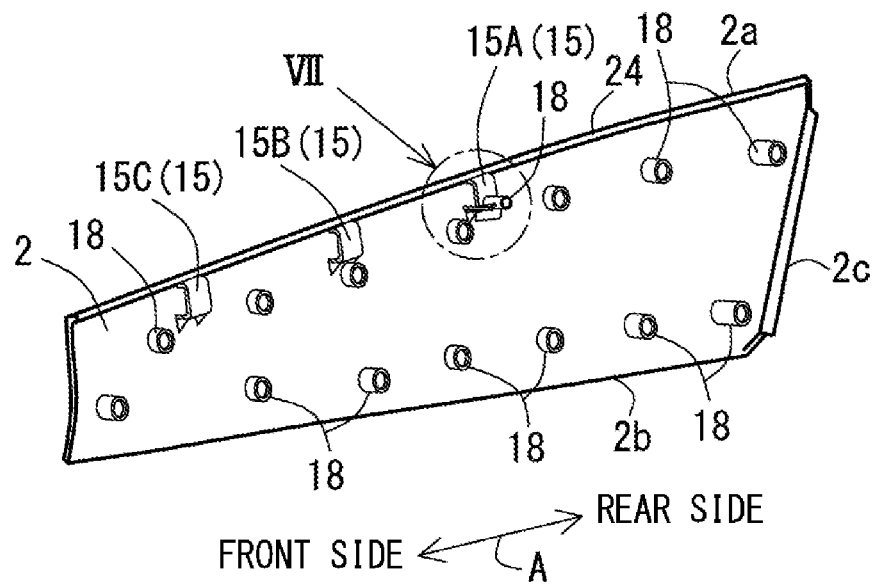
FIG. 6 is a perspective view of the base material, seen from a back surface thereof, according to the example.

A fastening portion 18 (specifically, a fastening boss) to be fastened to the base member 43 can be provided on the back surface of the base material 2 (see FIG. 6). A plurality of the fastening portions 18 can be provided along at least one side portion 2a and one side portion 2b of the base material 2. The fastening form of the fastening portion 18 and the base member 43 is not particularly limited, and one or a combination of two or more can be appropriately selected from screw fastening, fitting fastening, fastener fastening, adhesive fastening, and the like. Specifically, the fastening portion 18 and an attachment portion 19 provided on the base member 43 can be fastened by a screw. Note that the fastening portion 18 is required to be set in the vicinity of partings D1, D2 (that is, joint portions between the interior component 1 and the other interior components 44, 45; portions of the interior component 1 to which a pressing force from the other interior components 44, 45 is applied) in a design of the interior component 1.

The material of the base material 2 is not particularly limited. The base material 2 can contain a thermoplastic resin. Examples of the thermoplastic resin include polyolefins (particularly polypropylene), polyester, polystyrene, acrylic, polyamide, polycarbonate, polyacetal, and ABS. These may be used singly or in a combination of two or more kinds thereof. Furthermore, the base material can contain the thermoplastic resin and a reinforced fiber. As the reinforced fibers, inorganic fibers (glass fibers, carbon fibers, etc.) or organic fibers (natural fibers such as plant fibers and animal fibers, or resin fibers such as polyester, polyamide, and aramid) can be used. These may be used singly or in a combination of two or more kinds thereof. Examples of the plant fibers include bast-based plant fibers (for example, kenaf, flax, jute, hemp, ramie, and the like), vein-based plant fibers (for example, abaca, sisal, agave, and the like), wood-based plant fibers (for example, plant fibers collected from broad-leaved trees, needle-leaved trees, and the like.), and the other plant fibers (coconut shell fibers, oil palm empty fruit bunch fibers, rice straw fibers, wheat straw fibers, bamboo fibers, cotton, and the like). These may be used singly or in a combination of two or more kinds thereof. Note that the material of the base member is not particularly limited. The base member can be made of the same material as those used in the base material described above.

The skin material 3 covers the entire or a part of the front surface of the base material 2. The skin material 3 may or need not be bonded to the front surface of the base material 2 with an adhesive or the like. The skin material 3 has the woven fabric 7 in which the optical fibers 4 are woven as constituent yarns. The skin material 3 can have the woven fabric 7 and a cushion layer 8 layered on the back surface of the woven fabric 7 (see FIG. 4). The material of the cushion layer 8 is not particularly limited, but a sheet material made of a soft polyurethane foam is often used therefor. Other soft resin foams can also be used as long as sufficient cushioning properties thereof are ensured.

Figure 5:
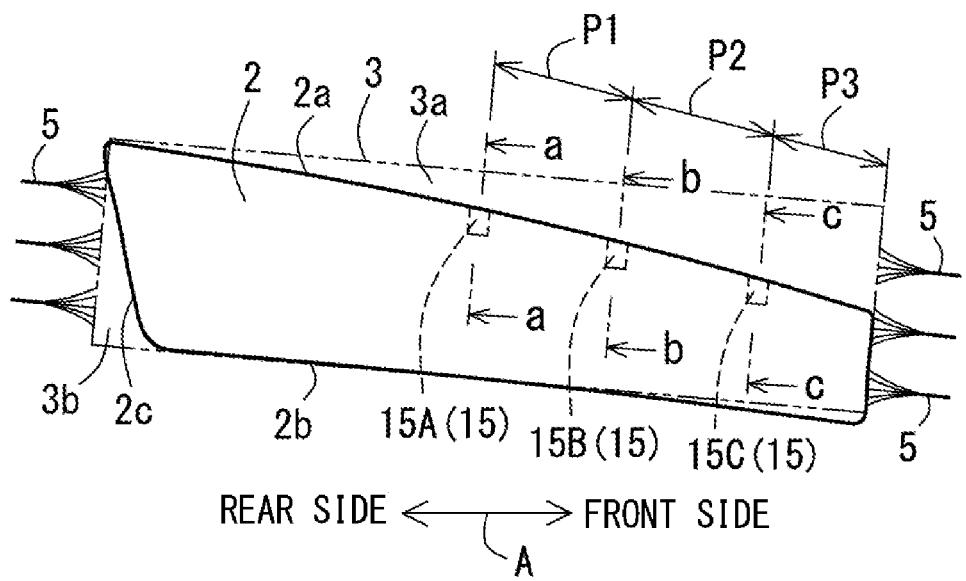
FIG. 5 is a plan view of a base material, seen from a front surface thereof, according to the example.

The skin material 3 can have a planar rectangular shape (including a square shape) so that the optical fibers 4 are not cut (see FIG. 5). When the skin material 3 having a planar rectangular shape covers the front surface of the base material 2 having a shape other than a planar rectangular shape, excess portions 3*a*, 3*b* of the skin material 3 are generated along at least the one side portion 2*a* and one side portion 2*c* of the base material 2. The excess portions 3*a*, 3*b* of the skin material 3 are usually formed in an elongated shape along the one side portion 2*a* and the one side portion 2*b* of the base material 2, and the size thereof in a direction orthogonal to the elongated direction gradually changes along the elongated direction.

The woven fabric 7 is a fabric woven by constituent yarns (warp and weft threads), and the weave structure thereof is not particularly limited. Specifically, for example, various weave structures such as plain weave, twill weave, and satin weave can be adopted. At least the optical fibers 4 are used as the constituent yarns of the woven fabric 7 (see FIG. 4). As the optical fibers 4, various optical fibers 4 having a core-sheath structure (multilayer structure) formed of a core (core layer) and a sheath (clad layer) and having different refractive indexes between the core layer and the clad layer can be adopted. The optical fibers 4 may be side-emission-type optical fibers 4 in which a light inputted from one end side is emitted from a part or the entire of a peripheral surface thereof, or may be end-surface-emission-type optical fibers 4 in which a light inputted from one end side is emitted from the other end side. In particular, when the side-emission-type optical fibers 4 are adopted, a light from a light source 6 can be emitted from a front surface of the woven fabric 7 (that is, the skin material 3) in which the optical fibers 4 are woven, whereby the designability and the presentation effect can be further enhanced.

The optical fibers 4 are used for at least one of warp and weft threads constituting the woven fabric, and in particular, are used for weft threads in one possible form. In a case of using the optical fibers 4 as warp threads, the proportion of the optical fibers 4 as warp threads is preferably 10% or more and 90% or less, more preferably 20% or more and 80% or less, and still more preferably 30% or more and 70% or less when the number of all warps threads is defined as 100%. In a case of using the optical fibers 4 as weft threads, the proportion of the optical fibers as weft threads is preferably 10% or more and 90% or less, more preferably 20% or more and 80% or less, and still more preferably 30% or more and 70% or less when the number of all weft threads is defined as 100%. The diameter of each of the optical fibers 4 is not particularly limited, but is preferably 0.25 to 3 mm and more preferably 0.1 to 1 mm from the viewpoint of the weaving performance and versatility.

The type of constituent yarns constituting the woven fabric 7 other than the optical fibers 4 (hereinafter, also referred to as the "other constituent yarns") is not particularly limited, but those made of plant-based and animal-based natural fibers, regenerated fibers such as rayon, semi-synthetic fibers such as acetate, synthetic fibers made of synthetic resin, or the like can be adopted. Examples of the resin constituting the synthetic fiber include polyamide resins such as nylon 6 and nylon 66, polyester resins such as polyethylene terephthalate, polybutylene terephthalate, and polytrimethylene terephthalate, polyolefin resins such as high density polyethylene and polypropylene, and poly-acrylic resins.

In the other constituent yarns constituting the woven fabric 7, the same yarn or different yarns may be used for the warp and weft threads. In addition, the other constituent yarns used for the warp yarns may be used singly or in a combination of two or more kinds thereof. Similarly, the other constituent yarns used for the weft yarns may be used singly or in a combination of two or more kinds thereof. The fineness of the other constituent yarns is not particularly limited, but is preferably 100 dtex or more and 1000 dtex or less, more preferably 200 dtex or more and 700 dtex or less, and still more preferably 300 dtex or more and 500 dtex or less, for example.

The skin material 3 is provided with the folded portion 11 turned back to the back surface of the base material 2 while being folded into a plurality of sheets (see FIGS. 8A to 8C). The folded portion 11 may be formed by folding the excess portion 3*a* of the skin material 3 into a plurality of sheets and then turning the excess portion 3*a* back to the back surface of the base material 2, or may be formed by turning the excess portion 3*a* of the skin material 3 back to the back surface of the base material 2 and then folding the excess portion 3*a* into a plurality of sheets. Furthermore, the folded portion 11 may be in a form of being folded so that back surfaces (that is, non-design surfaces) of the excess portion 3*a* of the skin material 3 are in contact with each other, or may be in a form of being folded so that front surfaces (that is, design surfaces) of the excess portion 3*a* of the skin material 3 are in contact with each other, or may be in a form of combining the above-mentioned forms in a case of being folded into three or more sheets.

The folded portion 11 can be formed in an elongated shape along the one side portion 2*a* of the base material 2. The folded portion 11 can be folded with the number of folded sheets and/or the folding width (that is, the width of the folded portion 11 in the direction orthogonal to the elongated direction) corresponding to the size of the excess portion 3*a* of the skin material 3. Specifically, the folded portion 11 can have, along the elongated direction thereof, a section folded with a first number of folded sheets and a section folded with a second number of folded sheets larger than the first number of folded sheets. Furthermore, the folded portion 11 can have, along the elongated direction thereof, a section folded with a first folding width and a section folded with a second folding width larger than the first folding width.

The clip body 15 may be independent of the base material 2 and attached later to the back surface of the base material 2, but is preferably integrally formed (specifically, integrally molded) with the base material 2 from a viewpoint of reducing the number of parts and the like. Although the number of the clip bodies 15 is not particularly limited, a plurality of the clip bodies are preferably provided along at least one side portion 2*a* of the base material 2 in order to clip the elongated folded portion 11 (see FIG. 6). Pitch intervals P1 and P2 between adjacent clip bodies among the plurality of clip bodies 15A to 15C can be set to such a value that the elongated folded portion 11 clipped by the respective clip bodies is prevented from swinging (see FIG. 5). Furthermore, a portion, of the folded portion 11, clipped by one of adjacent clip bodies among the plurality of clip bodies 15A to 15C and a portion, of the folded portion 11, clipped by the other clip body can be different from each other in terms of the number of folded sheets and/or the folding width (see FIGS. 8A to 8C). When the folded portion 11 is inserted into the plurality of clip bodies 15A to 15C, the folded portion 11 may be sequentially inserted into the clip bodies 15A to 15C, or the folded portion 11 may be simultaneously inserted into at least two or more clip bodies.

Figure 11A:
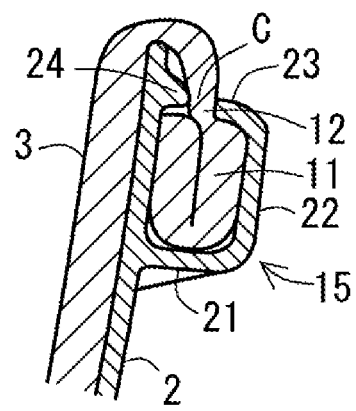
FIGS. 11A to 11C are explanatory views for explaining a clip body according to another modification.
Figure 11B:
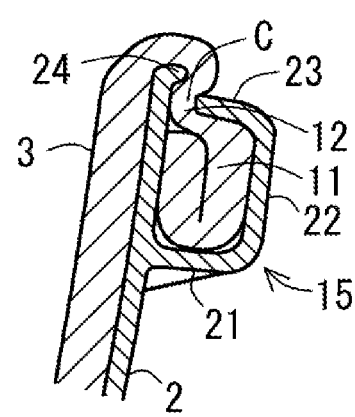

For example, as illustrated in FIGS. 7 and 8A to 8C, the clip body 15 may include a first wall portion 21 rising on the back surface of the base material 2, a second wall portion 22 extending from a rising end side of the first wall portion 21 toward an outer edge (that is, an end) of the base material 2, and a third wall portion 23 extending from an end side (that is, a tip) on a side close to the outer edge of the base material 2 in the second wall portion 22 toward the back surface of the base material 2, and a gap C may be formed between the third wall portion 23 and a tip of a protrusion 24 protruding from the back surface of the base material 2. The folded portion 11 can be clipped between the second wall portion 22 and the back surface of the base material 2 by being inserted into the clip body 15 (specifically, a space S surrounded by the first wall portion 21, the second wall portion 22, the third wall portion 23, the protrusion 24, and the back surface of the base material 2) via the gap C. Note that the third wall portion 23 may have a form (see FIG. 11B) in which the tip thereof is provided so as to face an inner portion of the protrusion 24 on the back surface of the base material 2, but from the viewpoint of the clipping property, etc. of the folded portion 11, the third wall portion 23 is preferably provided so that the tip thereof faces the tip of the protrusion 24 (see FIG. 3).

The size of the gap C is not particularly limited as long as the gap C forms an insertion hole for the folded portion 11. An interval C1 of the gap C can be set to such a value that the folded portion 11 can be inserted into the clip body 15 in a state of being squashed in a thickness direction and the folded portion 11 inserted into the clip body 15 (that is, the folded portion 11 has expanded from the squashed state) can be prevented from coming off. Furthermore, the interval C1 of the gap C can be set to a value smaller than the thickness of a non-folded portion 12 (that is, a portion turned back to the back surface of the base material 2 without being folded into a plurality of sheets) adjacent to the folded portion 11 of the skin material 3. In this case, when the folded portion 11 is inserted into the clip body 15, the non-folded portion 12 can be clipped between the third wall portion 23 and the tip of the protrusion 24. Besides, a vertical width L of the space S can be set to substantially the same value as the folding width of the folded portion 11 to be inserted into the clip body 15. Furthermore, a height H of the space S can be set to a value smaller than the thickness of the folded portion 11 to be inserted into the clip body 15.

In order to increase the strength of the clip body 15, the first wall portion 21 and the second wall portion 22 are preferably connected by a connecting wall 26 having a circular arc cross-section. The second wall portion 22 and the third wall portion 23 are preferably connected by a connecting wall 27 having a circular arc cross-section. In addition, the outer surface of the first wall portion 21 (that is, the surface facing a side opposed to the space S) and the back surface of the base material 2 are preferably connected by a reinforcing rib 28. The reinforcing ribs 28 can be disposed at both ends of the first wall portion 21 in a lateral width direction (that is, a direction along the one side portion 2a of the base material 2). Furthermore, an inner surface of the second wall portion 22 (that is, a surface forming the space S) and an inner surface of the third wall portion 23 (that is, a surface forming the space S) are preferably connected by a reinforcing rib 29. The reinforcing rib 29 can be disposed at a middle section between the second wall portion 22 and the third wall portion 23 in the lateral width direction (that is, the direction along the one side portion 2a of the base material 2).

The location of the protrusion 24 is not particularly limited. The protrusion 24 may have a form of being disposed at a position away inward from the outer edge side on the back surface of the base material 2 (see FIG. 11A), but is preferably disposed on the outer edge side of the back surface of the base material 2 in order to bring the fastening portion 18 further closer to the parting D1 in a design of the interior component 1 (see FIG. 3). In this case, the protrusion 24 can be formed by bending an outer edge portion of the base material 2 toward the back surface side.

The protrusion 24 can extend linearly along the one side portion 2a of the base material 2. The length of the protrusion 24 extending linearly is not particularly limited. The length of the protrusion 24 is preferably equal to or longer than the lateral width (that is, the width in the direction along the one side portion 2a of the base material 2) of the third wall portion 23 of the clip body 15 from the viewpoint of the clipping property, etc. of the folded portion 11. In particular, from the viewpoint of the strength, etc. of the base material 2, the protrusion 24 preferably has substantially the same length as the one side portion 2a of the base material 2 (see FIG. 6).

Figure 3:
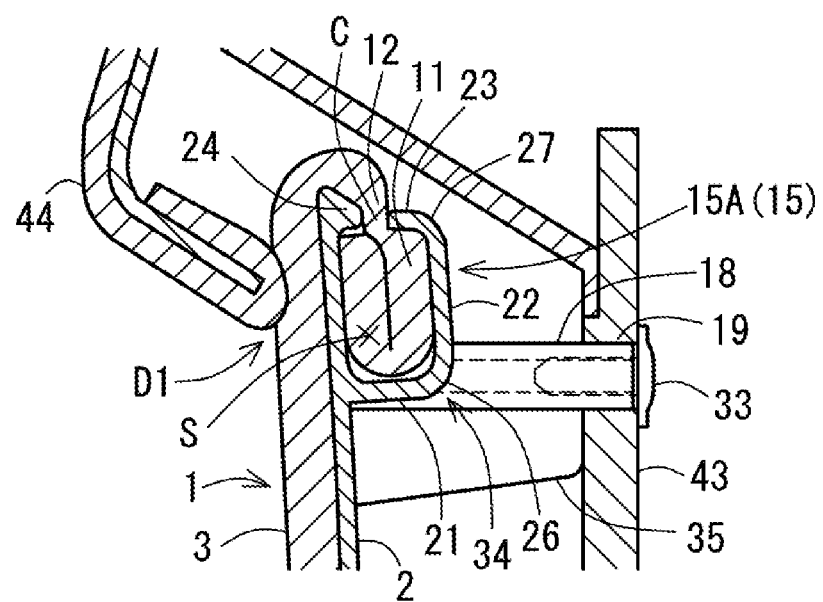
FIG. 3 is an enlarged view of a main part of FIG. 2.
Figure 7:
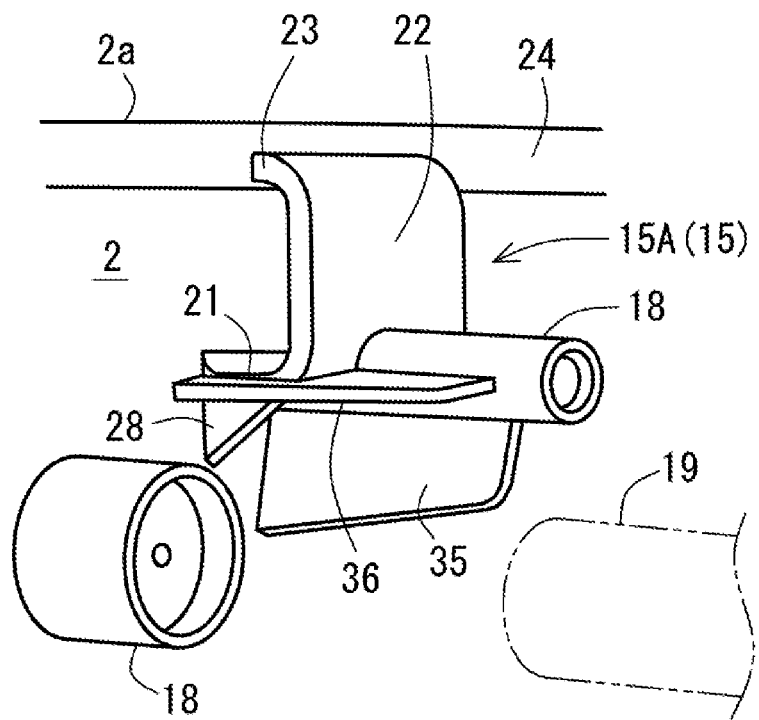
FIG. 7 is an enlarged view of a portion viewed from arrow VII in FIG. 6.

The fastening portion 18 to be fastened to the base member 43 can be provided on the clip body 15 (see FIGS. 3 and 7). The fastening portion 18 can be disposed at a root portion 34 (specifically, a portion extending over the first wall portion 21 and the second wall portion 22) rising on the back surface of the base material 2 in the clip body 15 (see FIGS. 3 and 7). In order to increase the strengths of the clip body 15 and the fastening portion 18, the outer surface of the fastening portion 18 and the back surface of the base material 2 are preferably connected by a reinforcing rib 35. The end of the reinforcing rib 35 can come into contact with the front surface of the base member 43 when the fastening portion 18 is fastened to the base member 43. Furthermore, the outer surface of the fastening portion 18 and the outer surface of the clip body 15 (specifically, the outer surface of the first wall portion 21), and the back surface of the base material 2 are preferably connected by a reinforcing rib 36. The end of the reinforcing rib 36 can come into contact with the front surface of the base member 43 when the fastening portion 18 is fastened to the base member 43. The clip body 15, the fastening portion 18, and the reinforcing ribs 35 and 36 can be integrally formed (specifically, integrally molded) with the base material 2.

Figure 9:
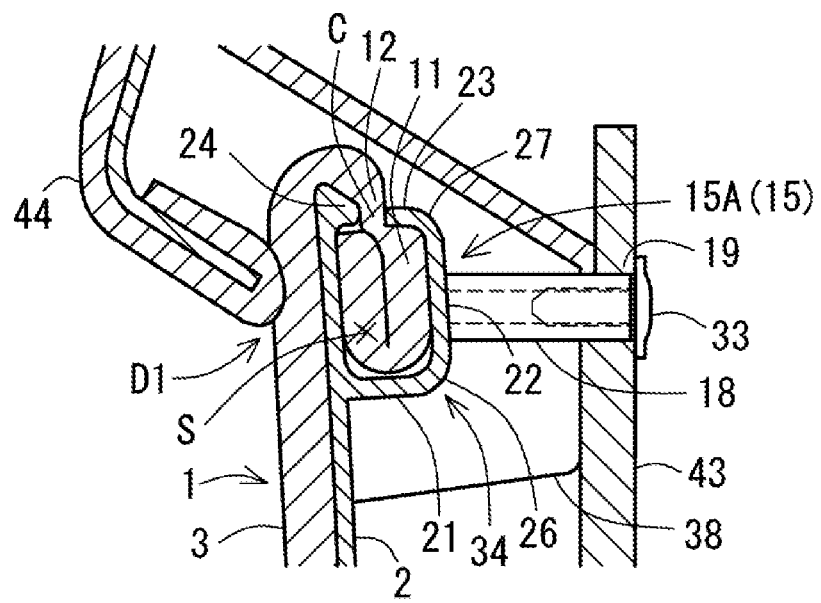
FIG. 9 is a cross-sectional view of a main part of an ornament according to a modification.
Figure 10:
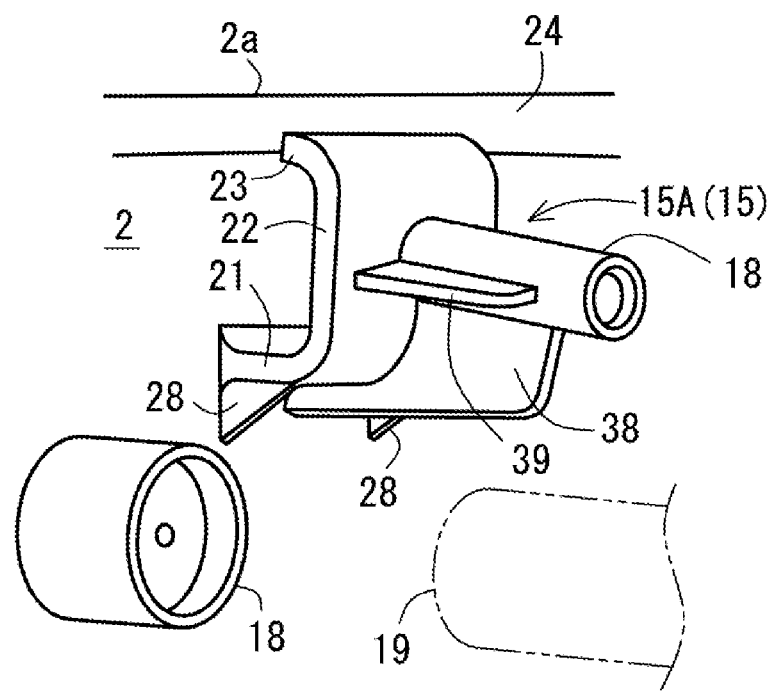
FIG. 10 is a perspective view of a clip body according to the modification.

The fastening portion 18 can be disposed at a portion (specifically, a middle section, of the second wall portion 22, in a vertical width direction orthogonal to the one side portion 2a of the base material 2) on a side closer to the outer edge of the base material 2 with respect to the root portion 34 rising on the back surface of the base material 2 in the clip body 15 (see FIGS. 9 and 10). In order to increase the strengths of the clip body 15 and the fastening portion 18, the outer surface of the fastening portion 18 and the outer surface of the clip body 15 (specifically, the outer surface of the second wall portion 22 and the outer surface of the first wall portion 21), and the back surface of the base material 2 are preferably connected by a reinforcing rib 38. The end of the reinforcing rib 38 can come into contact with the front surface of the base member 43 when the fastening portion 18 is fastened to the base member 43. Furthermore, the outer surface of the fastening portion 18 and the outer surface of the clip body 15 (specifically, the outer surface of the second wall portion 22) are preferably connected by a reinforcing rib 39. The end of the reinforcing rib 39 can come into contact with the front surface of the base member 43 when the fastening portion 18 is fastened to the base member 43. The clip body 15, the fastening portion 18, and the reinforcing ribs 38 and 39 can be integrally formed (specifically, integrally molded) with the base material 2.

The application of the present interior component is not particularly limited. Examples of the present interior components include interior components for vehicles constituting a door trim, an instrument panel, a roof trim, a floor trim, a luggage trim, a rear side trim, a rear parcel, a package tray, a pillar garnish, a switch base, a quarter panel, an arm rest, a center console, an overhead console, a sun visor, a seat, and the like for vehicles. Examples may also include an interior component constituting furniture such as a sofa or a chair. An end of another interior component 44 can come in contact with a front surface (that is, a design surface) of an end of the present interior component 1 (see FIG. 3). The contact portion forms the parting D1 in a design of the interior component 1.

EXAMPLE

Hereinafter, the present invention will be specifically described according to an example with reference to the drawings. In the present example, an ornament constituting a vehicular door trim is exemplified as the "interior component" according to the present invention.

As illustrated in FIGS. 1 and 2, a vehicular door trim 41 includes a plate-shaped trim body 42 and a base member 43 that cover a metal inner panel (not illustrated) from the vehicular interior side. The trim body 42 includes an ornament 1, an upper board 44, and a lower board 45 which form a design surface on the vehicle interior side.

The ornament 1 according to the present example includes a plate-shaped base material 2 to be fastened to the base member 43 and a skin material 3 for covering the front surface of the base material 2. The ornament 1 is disposed between the upper board 44 and the lower board 45 in a vertical direction. In addition, a lower end of the upper board 44 is in contact with the front surface (that is, a design surface) of an upper end in the front surface of the ornament 1, and the contact portion forms the parting D1 in a design of the ornament 1. Furthermore, an upper end of the lower board 45 is in contact with the front surface (that is, a design surface) of a lower end in the front surface of the ornament 1, and the contact portion forms the parting D2 in the design of the ornament 1. Note that the base member 43 is disposed so as to face the back surface of the ornament 1.

The base material 2 is formed in an elongated shape in a vehicle front-rear direction A, and has a planar shape with a plate width in the vertical direction gradually decreasing toward the front of the vehicle (see FIG. 5). A fastening portion 18 (specifically, a fastening boss) to be fastened to the base member 43 is provided on the back surface of the base material 2 (see FIG. 6). A plurality of the fastening portions 18 are provided along an upper-side portion 2a and a lower-side portion 2b of the base material 2. Furthermore, the fastening portion 18 and an attachment portion 19 provided on the base member 43 are fastened by a screw (see FIG. 7). A protrusion 24 extending linearly along the upper-side portion 2a protrudes from the back surface of the base material 2. The protrusion 24 has substantially the same length as the upper-side portion 2a.

Figure 4:
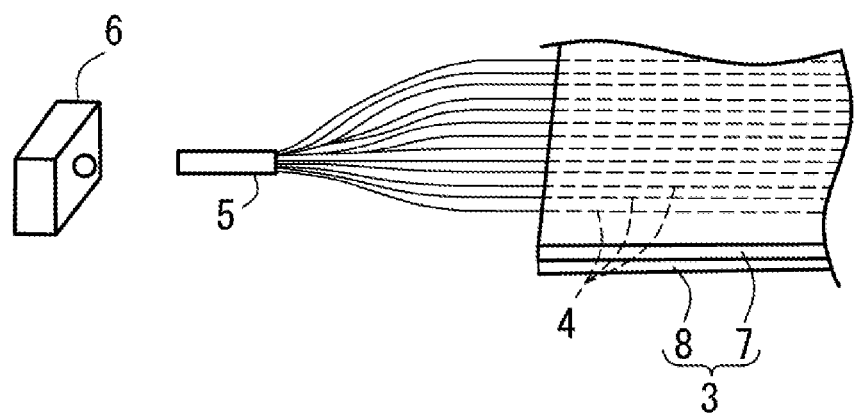
FIG. 4 is a perspective view of a skin material according to the example.

A skin material 3 includes a woven fabric 7 in which side-emission-type optical fibers 4 are woven as constituent yarns, and a cushion layer 8 layered on the back surface of the woven fabric 7 (see FIG. 4). When a light from a light source 6 is emitted by the optical fibers 4 from the front surface of the woven fabric 7 (that is, the skin material 3), the designability and the presentation effect can be further enhanced. Binding portions 5 of the optical fibers 4 are provided on both end sides of the skin material 3 in a predetermined direction (specifically, the vehicle front-rear direction A), and a light from the light source 6 enters each binding portion 5 (see FIG. 5). The light source 6 is held by a holding portion (not illustrated) provided on the back surface of the base material 2.

The skin material 3 has a planar rectangular shape so that the optical fibers 4 are not cut (see FIG. 5). When the skin material 3 having a planar rectangular shape covers the front surface of the base material 2 having a shape other than a planar rectangular shape, excess portions 3a, 3b of the skin material 3 are generated along the upper-side portion 2a and a lateral-side portion 2c of the base material 2. The excess portions 3a, 3b of the skin material 3 are formed in an elongated shape along the upper-side portion 2a and the lateral-side portion 2c of the base material 2, and the size thereof in a direction orthogonal to the elongated direction gradually changes along the elongated direction.

Figure 8:
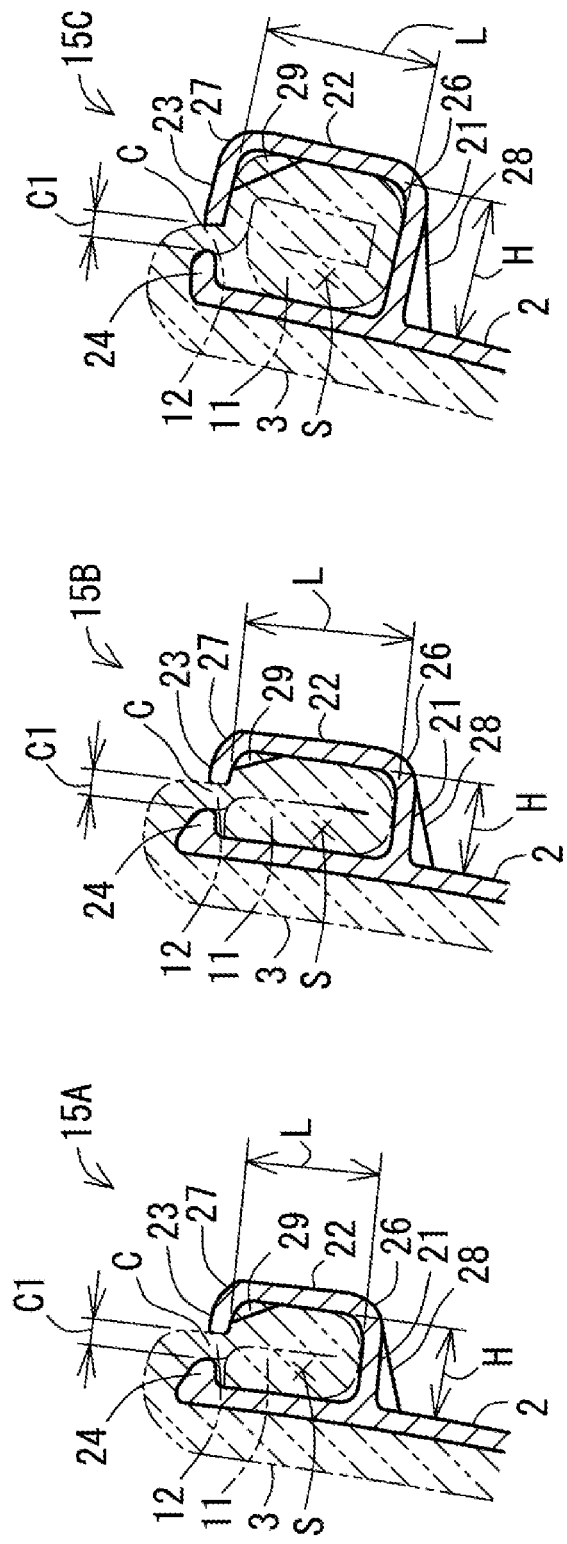
FIGS. 8A to 8C are explanatory views for explaining a clip body according to the example.

The skin material 3 is provided with a folded portion 11 turned back to the back surface of the base material 2 while being folded into a plurality of sheets (see FIG. 8). The folded portion 11 is formed in an elongated shape along the upper-side portion 2a of the base material 2 by folding the excess portion 3a of the skin material 3. Note that the excess portion 3b of the skin material 3 along the lateral-side portion 2c of the base material 2 is turned back to the back surface of the base material 2 without being folded, and is attached to the back surface of the base material 2 with an adhesive or the like.

On the back surface of the base material 2, a clip body 15 for clipping the folded portion 11 is provided (see FIG. 6). A plurality (three in FIG. 6) of the clip bodies 15 are provided along the upper-side portion 2a of the base material 2 in order to clip the elongated folded portion 11 thereamong. The interval between the adjacent clip bodies 15 is set to such a value that the elongated folded portion 11 clipped by the respective clip bodies 15 is prevented from swinging. More specifically, a pitch interval P1 between the clip bodies 15A and 15B is set to about 140 mm, a pitch interval P2 between the clip bodies 15B and 15C is set to about 150 mm, and an interval P3 between the clip body 15C and a side of the base material 2 is set to about 100 mm (see FIG. 5).

As illustrated in FIGS. 7 and 8A to 8C, the clip bodies 15A to 15C each include a first wall portion 21, a second wall portion 22, and a third wall portion 23. The first wall portion 21 rises on the back surface of the base material 2. The second wall portion 22 extends from a rising end side of the first wall portion 21 toward an outer edge of the base material 2. In addition, the third wall portion 23 extends from an end side on a side close to the outer edge of the base material 2 in the second wall portion 22 toward the back surface (specifically, the protrusion 24) of the base material 2. A gap C forming an insertion hole for the folded portion 11 is formed between the third wall portion 23 and the tip of the protrusion 24. The folded portion 11 can be clipped between the second wall portion 22 and the back surface of the base material 2 by being inserted into the clip bodies 15A to 15C (specifically, a space S surrounded by the first wall portion 21, the second wall portion 22, the third wall portion 23, the protrusion 24, and the back surface of the base material 2) via the gap C.

The first wall portion 21 and the second wall portion 22 are connected by a connecting wall 26 having a circular arc cross-section. The second wall portion 22 and the third wall portion 23 are connected by a connecting wall 27 having a circular arc cross-section. The outer surface of the first wall portion 21 and the back surface of the base material 2 are connected by a reinforcing rib 28. The reinforcing rib 28 is disposed at each of both ends of the first wall portion 21 in a lateral width direction. Furthermore, the inner surface of the second wall portion 22 and the inner surface of the third wall portion 23 are connected by a reinforcing rib 29. The reinforcing rib 29 is disposed at a middle section of the second wall portion 22 in the lateral width direction.

As illustrated in FIGS. 3 and 7, the fastening portion 18 (specifically, a fastening boss) to be fastened to the base member 43 is provided on the clip body 15A. This fastening portion 18 and the attachment portion 19 provided on the base member 43 are fastened by a screw 33. Besides, the fastening portion 18 is disposed at a root portion 34 (specifically, a portion extending over the first wall portion 21 and the second wall portion 22) rising on the back surface of the base material 2 in the clip body 15A. An outer peripheral surface of the fastening portion 18 and the back surface of the base material 2 are connected by a reinforcing rib 35. Furthermore, the outer peripheral surface of the fastening portion 18, the outer surface of the first wall portion 21, and the back surface of the base material 2 are connected by a reinforcing rib 36. The ends of the reinforcing ribs 35, 36 come into contact with the front surface of the base member 43 when the fastening portion 18 is fastened to the base member 43.

Here, the size of the gap C and the space S in each of the clip bodies 15A to 15C will be described. In the present example, the thickness of a portion, of the skin material 3, excluding the folded portion 11 is set to about 5.6 mm, and the thickness of this portion becomes about 2 mm by crushing a section, of the folded portion 11, folded into two in the thickness direction, and the thickness of this portion becomes about 3 mm by crushing a section, of the folded portion 11, folded into three in the thickness direction.

In the clip body 15A, as illustrated in FIGS. 8A to 8C, the interval C1 between the gaps C is set to about 3 mm, the vertical width L of the space S is set to about 15 mm, and the height H of the space S is set to about 10 mm so as to be capable of clipping a portion, of the folded portion 11, folded into two. Besides, in the clip body 15B, the interval C1 between the gaps C is set to about 3 mm, the vertical width L of the space S is set to about 20 mm, and the height H of the space S is set to about 10 mm so as to be capable of clipping a portion, of the folded portion 11, folded into two. Furthermore, in the clip body 15C, the interval C1 between the gaps C is set to about 5 mm, the vertical width L of the space S is set to about 20 mm, and the height H of the space S is set to about 15 mm so as to be capable of clipping a portion, of the folded portion 11, folded into three.

Next, the action and effect of the ornament 1 configured as mentioned above will be described. When the folded portion 11 in a state of being crushed in the thickness direction is inserted into the clip body 15 through the gap C, the second wall portion 22 is deformed, by the folded portion 11, in a direction away from the back surface of the base material 2 (that is, a direction in which the gap C expands) with the upper end of the first wall portion 21 as a fulcrum, and the folded portion 11 passes through the gap C. When the folded portion 11 is completely inserted into the clip body 15, the folded portion 11 expands from a crushed state and is clipped between the second wall portion 22 and the reinforcing rib 29, and the back surface of the base material 2. Furthermore, a non-folded portion 12 continuous with the folded portion 11 is clipped between the third wall portion 23 and the tip of the protrusion 24. In this clipped state, the folded portion 11 is prevented from escaping from the inside of the clip body 15 by the third wall portion 23 and the protrusion 24.

As discussed above, in the ornament 1 according to the present example, the skin material 3 has the woven fabric 7 in which the optical fiber 4 is woven as a constituent yarn, the skin material 3 is provided with the folded portion 11 turned back to the back surface of the base material 2 while being folded into a plurality of sheets, and the clip bodies 15A to 15C for clipping the folded portion 11 are provided on the back surface of the base material 2. Accordingly, a region, of the excess portion 3a in the skin material 3, turned back to the back surface of the base material 2 can be reduced. Therefore, the fastening portion 18 for the base member 43 can be disposed on the side closer to the outer edge of the back surface of the base material 2 to bring the fastening portion closer to the partings D1 and D2 in the design of the ornament 1.

Besides, in the present example, the fastening portion 18 to be fastened to the base member 43 is provided on the clip body 15A. Accordingly, the fastening portion 18 can be brought further closer to the parting D1 in a design of the ornament 1.

Besides, in the present example, the fastening portion 18 is disposed at the root portion 34 rising on the back surface of the base material 2 in the clip body 15A. Accordingly, even when the material of the base material 2 is polypropylene or the like and the clip body 15A integrally formed with the base material 2 easily bends, the fastening portion 18 can be appropriately fastened to the base member 43.

Furthermore, in the present example, the clip bodies 15A to 15C each include the first wall portion 21, the second wall portion 22, and the third wall portion 23, the gap C is formed between the third wall portion 23 and the tip of the protrusion 24 protruding from the back surface of the base material 2, and the folded portion 11 is inserted into the clip bodies 15A to 15C through the gap C to be clipped between the second wall portion 22 and the back surface of the base material 2. Thus, the folded portion 11 can be easily and firmly clipped.

Besides, in the present example, the inner surface of the second wall portion 22 and the inner surface of the third wall portion 23 are connected by the reinforcing rib 29. Thus, the folded portion 11 can be more firmly clipped with a pressing force of the reinforcing rib 29.

Furthermore, in the present example, a plurality of the clip bodies 15A to 15C are provided along the upper-side portion 2a of the base material 2. Accordingly, the elongated folded portion 11 can be clipped without swinging.

Next, an ornament according to a modification will be described. A part having the same configuration as that of the ornament 1 is denoted by the same reference numeral, and a detailed description thereof will be omitted.

As illustrated in FIGS. 9 and 10, the fastening portion 18 (that is, a fastening boss) to be fastened to the base member 43 is provided on the clip body 15A. This fastening portion 18 and the attachment portion 19 provided on the base member 43 are fastened by the screw 33. The fastening portion 18 is disposed at a portion (specifically, a middle section, of the second wall portion 22, in the vertical width direction) on a side closer to the outer edge of the base material 2 with respect to the root portion 34 rising on the back surface of the base material 2 in the clip body 15A.

The outer peripheral surface of the fastening portion 18 and the outer surface of the clip body 15A (specifically, the outer surface of the second wall portion 22 and the outer surface of the first wall portion 21), and the back surface of the base material 2 are connected by the reinforcing rib 38. Furthermore, the outer peripheral surface of the fastening portion 18 and the outer surface of the clip body 15A (specifically, the outer surface of the second wall portion 22) are connected by the reinforcing rib 39. The ends of the reinforcing ribs 38, 39 come into contact with the front surface of the base member 43 when the fastening portion 18 is fastened to the base member 43.

In a case of the present clip body 15A, when the material of the base material 2 is an ABS resin or the like, and the clip body 15A integrally formed with the base material 2 hardly bends, the fastening portion 18 for the base member 43 can be brought further closer to the parting D1 in the design of the ornament 1.

Figure 11C:
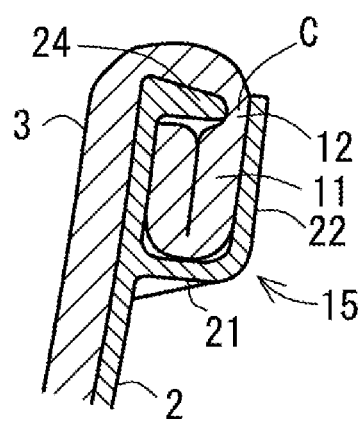
Figure 12:
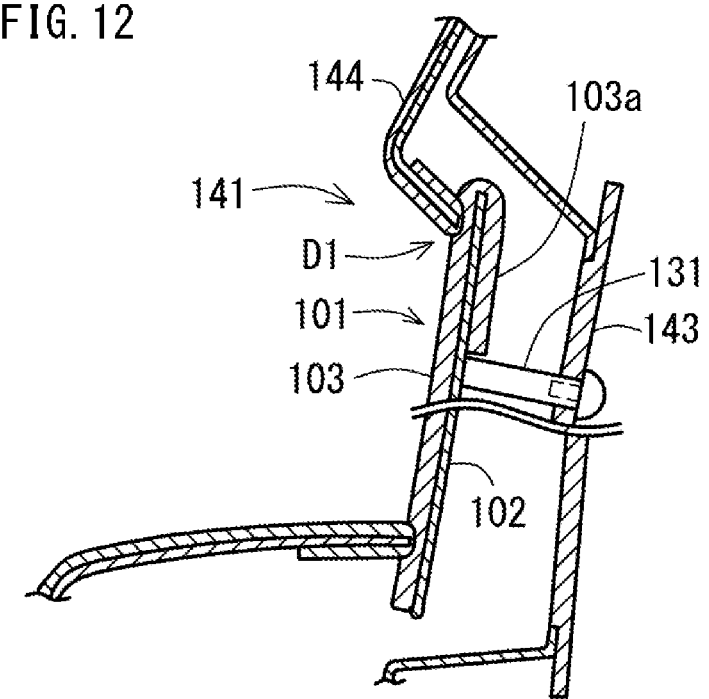
FIG. 12 is a cross-sectional view of a main part of a vehicular door trim including a conventional ornament.
Figure 13A:
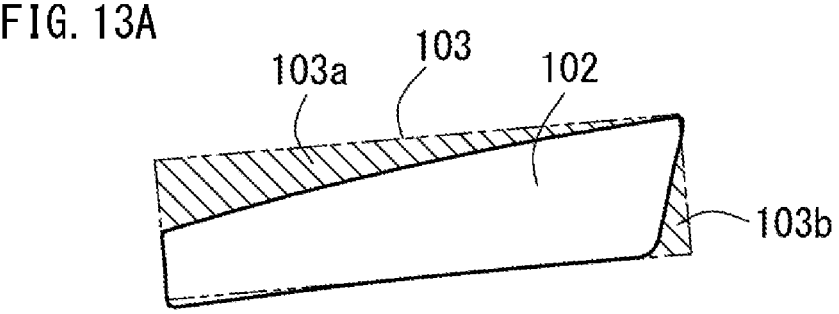
FIGS. 13A and 13B are explanatory views for explaining a conventional ornament.
Figure 13B:
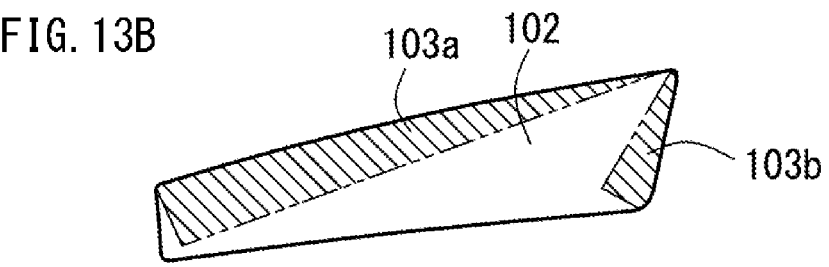

Note that the present invention is not limited to the above example, and the example can be variously changed within the scope of the present invention depending on the purpose and use. That is, in the above example, the clip body 15 including the first wall portion 21, the second wall portion 22, and the third wall portion 23 and having the gap C formed between the third wall portion 23 and the tip of the protrusion 24 is exemplified, but the present invention is not limited thereto. For example, as illustrated in FIG. 11C, the clip body 15 may include the first wall portion 21 and the second wall portion 22 without including the third wall portion 23, and may have the gap C formed between the second wall portion 22 and the tip of the protrusion 24.

In the above example, a form in which the fastening portion 18 is provided on one clip body 15A of the plurality of clip bodies 15A to 15C is exemplified, but the present invention is not limited thereto. For example, the fastening portions 18 may be provided on at least two or more clip bodies of the plurality of clip bodies 15A to 15C. Besides, a contact portion that comes in contact with the base member 43 may be provided on the clip body 15A. Furthermore, in some forms, the fastening portion 18 or the contact portion need not be provided on the plurality of clip bodies 15A to 15C.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects.

Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is widely used as a technique related to an interior component in which an excess portion of a skin material is turned back to a back surface of a base material.

The invention claimed is:

1. An interior component comprising:
    a plate-shaped base material to be fastened to a base member; and
    a skin material for covering a front surface of the base material, wherein
    the skin material has a woven fabric in which an optical fiber is woven as a constituent yarn,
    the skin material is provided with a folded portion turned back to a back surface of the base material while being folded into a plurality of sheets,
    a clip body for clipping the folded portion is provided on the back surface of the base material, and
    a fastening portion that extends toward the base member and is fastened to the base member is provided on the clip body.

2. The interior component according to claim 1, wherein the clip body includes a first wall portion rising on the back surface of the base material, a second wall portion extending from a rising end side of the first wall portion toward an outer edge of the base material, and a third wall portion extending from an end side on a side close to the outer edge of the base material in the second wall portion toward the back surface of the base material,
    a gap is formed between the third wall portion and a tip of a protrusion protruding from the back surface of the base material, and
    the folded portion is inserted into the clip body through the gap to be clipped between the second wall portion and the back surface of the base material.

3. The interior component according to claim 1, wherein a plurality of the clip bodies are provided along at least one side portion of the base material.

4. The interior component according to claim 1, the interior component being an ornament constituting a vehicular door trim.

5. The interior component according to claim 1, wherein the fastening portion has a reinforcing rib formed integrally with an outer periphery of the fastening portion, the clip body, and the back surface of the base material.

6. The interior component according to claim 5, wherein the reinforcing rib is in contact with the base member.

7. The interior component according to claim 1, wherein the base member is provided on a back side of the base material so as to be spaced apart from the base material, and
    the fastening portion protrudes from a back surface of the clip portion to extend toward the based member.

* * * * *